(12) United States Patent
Kawano

(10) Patent No.: US 6,256,112 B1
(45) Date of Patent: Jul. 3, 2001

(54) COLOR TYPE DETERMINING DEVICE

(75) Inventor: Hiroshi Kawano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/105,902

(22) Filed: Jun. 26, 1998

(30) Foreign Application Priority Data

Jul. 2, 1997 (JP) ...................................................... 9-177302

(51) Int. Cl.[7] .............................. B41J 15/00; H04N 1/21; H04N 1/40; G06K 9/00; G06K 9/36
(52) U.S. Cl. ........................ 358/1.9; 358/296; 358/448; 358/461; 358/462; 358/505; 358/520; 382/162; 382/167; 382/274
(58) Field of Search ..................................... 358/505, 538, 358/527, 515, 447, 448, 452, 453, 1.9, 296, 520, 461, 462; 382/162, 167, 274

(56) References Cited

U.S. PATENT DOCUMENTS 5,321,531 * 6/1994 Hasbe et al. ......................... 358/505

FOREIGN PATENT DOCUMENTS 4-282968 * 10/1992 (JP) ................................. H04N/1/46

* cited by examiner

Primary Examiner—Edward Coles
Assistant Examiner—Twyler Lamb
(74) Attorney, Agent, or Firm—Dike Bronstein Roberts & Cushman IP Group; David G. Conlin; George W. Hartnell, III

(57) ABSTRACT

A color type determining device is made up of a difference detecting section, a density distribution determining section, a density distribution correcting section, a color line counter, and a color/monochrome determining section. In the difference detecting section, the color type determining device finds, from read data of an original read by a scanner section, a color density for each pixel. In the density distribution determining section, the color type determining device finds a color density distribution for each line, and, based on the color density distribution for each line, determines whether that line is a color line. In the color line counter, the color type determining device counts the total number of color lines, and in the color/monochrome determining section determines from the total number of color lines whether the original is a color original.

When the density distribution determining section does not determine whether a line is a color line, the color type determining device corrects the color density distribution using the density distribution correcting section, and re-determines whether the line is a color line.

12 Claims, 10 Drawing Sheets

COLOR TYPE DETERMINING DEVICE

FIELD OF THE INVENTION

The present invention relates to a device for determining the color type of an original, to be used in, for example, digital color copy machines and printing machines capable of multicolor input and multicolor printing, and relates in particular to a color type determining device for determining whether an original is a color original including colored information, or a monochrome original made up solely of non-colored information.

BACKGROUND OF THE INVENTION

In general, when a digital color copy machine performs copying of a color image, the original is first scanned in order to obtain image signals corresponding to the three colors yellow, magenta, and cyan. Then, based on these image signals, a copy image is formed using toners of the three foregoing colors. Further, in digital color copy machines using three colored toners, the colored toners are also used for black pixels.

However, when recreating black pixels using three colored toners, toner consumption is greater than when using black toner, and there are problems such as blurring of the outline of the image due to slight misalignment of the three colors. These problems are especially marked when copying a monochrome original such as a page of characters.

For this reason, some digital color copy machines now on the market are provided with a color type determining device whose function is to pre-scan the original to read the image data thereof, and, based on the image data, to automatically distinguish generally whether the original is a color image including colored information, or a monochrome original made up solely of non-colored information.

In this kind of color type determining device, generally, the image data read is first stored in an image memory, and the stored data is broken down by pixel into yellow (hereinafter referred to simply as "Y"), magenta (hereinafter referred to simply as "M"), and cyan (hereinafter referred to simply as "C"). Then it is determined whether the original is a color original or monochrome original based on a ratio among the Y, M, and C components. Generally, this kind of color type determining device, based on the number (area ratio) of color pixels in the image data, decides that an original is a color original when the number of color pixels is greater than a predetermined number.

Then, if it is decided that the original is a monochrome original made up solely of non-colored information, copying is performed using black toner alone, and if it is decided that it is a color original including colored information, color copying is performed using toners of the three colors Y, M, and C, or using toners of the four colors Y, M, C, and black.

However, with the foregoing conventional structure, in order to determine whether the original is color or monochrome, it is necessary to first store the read image data in an image memory, and thus an expensive, high capacity image memory is necessary. This gives rise to the problem of increase of the cost of manufacturing the copying machine. Further, with the foregoing conventional structure, since the color type of the original is determined after first storing the read image data in the image memory, it is not possible to automatically determine from the read image data in real time whether the original is color or monochrome, and this has the drawback that high-speed processing is not possible.

In this connection, Japanese Unexamined Patent Publication No. 4-282968/1992 (Tokukaihei 4-282968) discloses a method of determining whether an original is color or monochrome based on a number of color blocks outputted for each line. In this conventional art, it is first determined whether each pixel is color or monochrome, then whether each line is color or monochrome, and then whether the entire original is color or monochrome.

However, with the art disclosed in the foregoing publication, whether a line is color or monochrome is determined based on whether the pixels thereof are color pixels or monochrome pixels, which gives rise to the problem that it is difficult to reflect general characteristics of the line, such as edge portions, relationships among pixels, etc.

In other words, in the color type determination method disclosed in Japanese Unexamined Patent Publication No. 4-282968/1992, when more than a predetermined number of successive color pixels are distinguished in a line, that successive area is treated as a color block, and whether or not the line is a color line is determined based on the number of color blocks in the line.

However, with the foregoing color type determination method, since the basic unit is a predetermined number of successive color pixels, a condition of color type determination is that the image includes a color area of a certain extent. Consequently, images having color areas of comparatively small extent, such as color images made up of dots, are outside the scope of color type determination.

With the art disclosed in the foregoing publication, in order to determine the color type of images having color areas of comparatively small extent, it is sufficient to reduce the predetermined number of successive color pixels, which is the standard for determining the color blocks. However, in this case, color noise, etc. may be treated as a color block, and the precision of color type determination is reduced. Incidentally, color noise is noise which occurs primarily at edge portions of monochrome lines due to the precision of the CCD, vibration or misalignment of devices, etc.

SUMMARY OF THE INVENTION

The object of the present invention is to provide a color type determining device capable of generally determining from read image data in real time whether an original is a color original or a monochrome original, and capable of determining that an image having color areas of comparatively small extent is a color original.

In order to attain the foregoing object, a color type determining device according to the present invention receives read data made up of a plurality of color components read from an original, and determines, based on the read data, whether the original is a color original including colored information, or a black-and-white original made up solely of non-colored information; and is made up of a color density detecting section, which, from the read data, quantifies and detects color density of each pixel; a density distribution determining section, which, from the color densities found by the color density detecting section, finds a color density distribution for each line, and determines from the color density distribution whether that line is a color line including colored information; a color line counting section, which counts the total number of lines determined to be color lines by the density distribution determining section; and an original color type determining section, which determines that the original is a color original including colored information when the total number of color lines counted by the color line counting section exceeds a certain previously set threshold value.

With the foregoing structure, the color density detecting section quantifies the color density of each pixel, and the density distribution determining section finds the color density distribution for each line. The density distribution determining section determines from the color density distribution whether the line in question is a color line including colored information. The color line counting section counts the total number of lines determined to be color lines by the density distribution determining section, and the original color type determining section determines, based on the total number of color lines, whether the original is a color original including colored information. Incidentally, the color density detected by the color density detecting section is, for example, a small value for monochrome pixels in which the various color components in the read data received from the reading section show comparatively close values, and is a large value for color pixels in which at least two of the color components show disparate values.

Consequently, the foregoing color type determining device determines whether each line is a color line based on the color density distribution of the line in question, thus enabling color type determination which takes account of the general characteristics of that line. Accordingly, the precision of determination of the color type of the original can be improved, and flexible color type determination in keeping with needs and with the application thereof is possible.

In addition, since the foregoing color type determining device, in determining the color type of the original, first determines whether each line is a color line, and then determines the color type of the entire original using this line information, the memory for processing for determining the color type of the original need only store one line, and thus a large-scale memory is not needed. Moreover, the flow of line processing conforms to the scanning direction, thus enabling high-speed processing.

In the foregoing color type determining device, furthermore, the color density detecting section finds differences among the color data for each of the plurality of color components inputted, and, of the differences calculated, outputs to the density distribution determining section, as the color density, the difference having the greatest absolute value.

With the foregoing structure, the color density detected by the color density detecting section is, among the differences in data quantity among the color data for each of the plurality of color components inputted, the difference having the greatest absolute value. Accordingly, the color density detecting section is capable of expressing color density using a single parameter, which enables a simple circuit structure and high-speed processing.

In the foregoing color type determining device, furthermore, the density distribution determining section assigns all of the pixels in a line to a colored domain, a non-colored domain, and an indeterminate domain belonging to neither the colored nor the non-colored domain, and determines whether the line is a color line based on the number of pixels included in each of the colored and non-colored domains.

With the foregoing structure, the density distribution determining section classifies all of the pixels of a certain line into colored, non-colored, and indeterminate domains, and first determines whether the line is a color line based on the number of pixels included in the colored and non-colored domains. Further, in cases when this determination cannot be made, by introducing the indeterminate domains, which include pixels of intermediate colors such as pastel colors (which conventionally could not be assigned to either color or monochrome), it is possible to determine whether correction of the determination result is necessary.

In this way, by also taking into account pixels of intermediate colors, and, when necessary, determining whether correction of the determination result is necessary, the precision of color/monochrome determination can be improved.

The foregoing color type determining device further includes a density distribution correcting section, which, when the density distribution determining section cannot determine whether a certain line is a color line, corrects the determination result of the density distribution determining section using the number of pixels belonging to the indeterminate domain, and, based on the result of this correction, re-determines whether the line in question is a color line.

With a line having a large number of pixels of intermediate colors, such as pastel colors, belonging to the indeterminate domain, there are cases when the determination of the density distribution determining section is not conclusive. With the foregoing structure, however, even in such cases, the density distribution correcting section corrects the result of the density distribution determining section using the number of pixels in the indeterminate domain, and, based on the result of this correction, re-determines whether the line is a color line.

By this means, the foregoing color type determining device is capable of color type determination which also takes into account pixels of intermediate colors, and thus the precision of color type determination for color lines can be improved, and flexible color type determination in keeping with needs and with the application thereof is possible.

In the foregoing color type determining device, furthermore, in the density distribution determining section, threshold values, which are standards for determining from the number of pixels included in the colored domain, non-colored domain, and indeterminate domain of a line whether that line is a color line, are variable.

With the foregoing structure, the threshold values, which are the standards by which the density distribution determining section determines from the number of pixels included in the colored domain, non-colored domain, and indeterminate domain of a line whether the line is a color line, can be varied according to the situation or environment.

By this means, the dividing line between what kind of originals the color type determining device determines are color originals and what kind of originals it determines are monochrome originals, can be freely set, which enables color type determination, and, in turn, printing of copies, which are in keeping with the application thereof.

An image-forming device according to the present invention is made up of a reading section, which reads an original and calculates read data made up of a plurality of color components; the foregoing color type determining device; and a printing section, which selects a print mode based on the result of color type determination by the color type determining device.

With the foregoing structure, the reading section reads the original and calculates the read data in pixels. The color type determining device determines from the read data received from the reading section whether each line is a color line, and then determines from this line information whether the original is a color original or a monochrome original. The printing section, based on the result of color type determination by the color type determining device, is set either to color mode, in which copying is performed using a plurality of colors of toner, or to monochrome mode, in which copying is performed using black toner alone.

By this means, in the foregoing image-forming device, the precision of determination of the color type of the original can be improved, and flexible color type determination in keeping with needs and with the application thereof is possible. In addition, in the foregoing image-forming device, since the memory for processing for determining the color type of the original need only store one line, a large-scale memory is not needed. Moreover, the flow of line processing conforms to the scanning direction, thus enabling high-speed processing.

An image-forming method according to the present invention includes a step a, in which an original is read and read data made up of a plurality of color components is calculated; a step b, in which, from the read data, color density of each pixel is quantified and detected; a step c, in which, from the color density of each pixel, a color density distribution of each line is found, and it is determined from the color density distribution of each line whether that line is a color line including colored information; a step d, in which a total number of color lines is counted; a step e, in which, if the total number of color lines exceeds a previously set predetermined threshold value, it is determined that the original is a color original including colored information; and a step f, in which a print mode is selected based on the result of the determination in step e, and printing is performed.

With the foregoing method, since it is determined whether each line is a color line based on the color density distribution of the line in question, color type determination which takes account of the general characteristics of each line is possible. Accordingly, the precision of determination of the color type of the original can be improved, and flexible color type determination in keeping with needs and with the application thereof is possible. In addition, since, in determining the color type of the original, it is first determined whether each line is a color line, and then the color type of the entire original is determined using this line information, the memory for processing for determining the color type of the original need only store one line, and thus a large-scale memory is not needed. Moreover, the flow of line processing conforms to the scanning direction, thus enabling high-speed processing.

The foregoing image-forming method further includes between step c and step d a step g, in which, when the determination in step c of whether a line is a color line cannot be made, the result of the determination is corrected, and it is re-determined whether the line is a color line.

With the foregoing method, even with lines including a large number of pixels of intermediate colors such as pastel colors, which conventionally could not be conclusively determined to be color lines, color type determination taking account of such lines is possible, and thus the precision of color type determination for color lines can be improved, and flexible color type determination in keeping with needs and with the application thereof is possible.

Additional objects, features, and strengths of the present invention will be made clear by the description below. Further, the advantages of the present invention will be evident from the following explanation in reference to the drawings.

DESCRIPTION OF THE EMBODIMENTS

The following will explain an embodiment of the present invention with reference to FIGS. 1 through 10. The present embodiment will explain a case in which the color components read are the three color components yellow (Y) magenta (M), and cyan (C), each of which may show density values of from 0 to 255.

Figure 1:
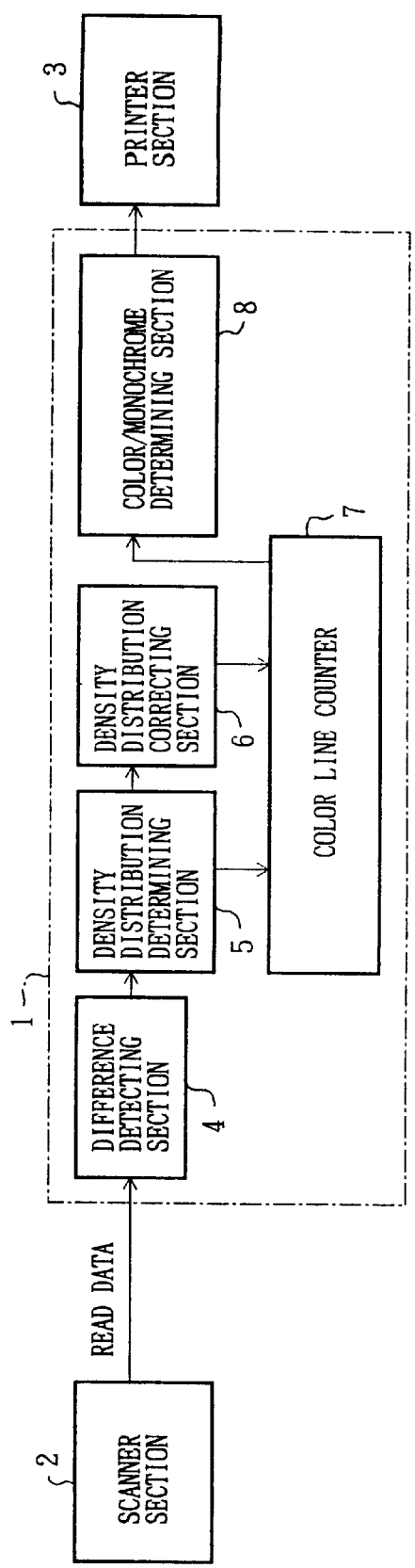
FIG. 1 shows an embodiment of the present invention, and is a block drawing showing the structure of an image-forming device provided with a color type determining device.

As shown in FIG. 1, an image-forming device according to the present embodiment is made up of a scanner section 2 (reading means), a color type determining device 1, and a printer section 3 (printing means). As shown in FIG. 1, the color type determining device 1 is made up of a difference detecting section 4 (color density detecting means), a density distribution determining section 5 (density distribution determining means), a density distribution correcting section 6 (density distribution correcting means), a color line counter 7 (color line counting means), and a color/monochrome determining section 8 (original color type determining means), and determines from read data received from the scanner section 2 whether an original is a color original or a monochrome original. In the printer section 3, a print mode is set based on the result of color type determination by the color type determining device 1. In other words, if the original is determined to be a color original, the printer section 3 is set to color mode, in which copying is performed using three or four colors of toner, and if the original is determined to be a monochrome original, the printer section 3 is set to monochrome mode, in which copying is performed using black toner alone.

Figure 2:
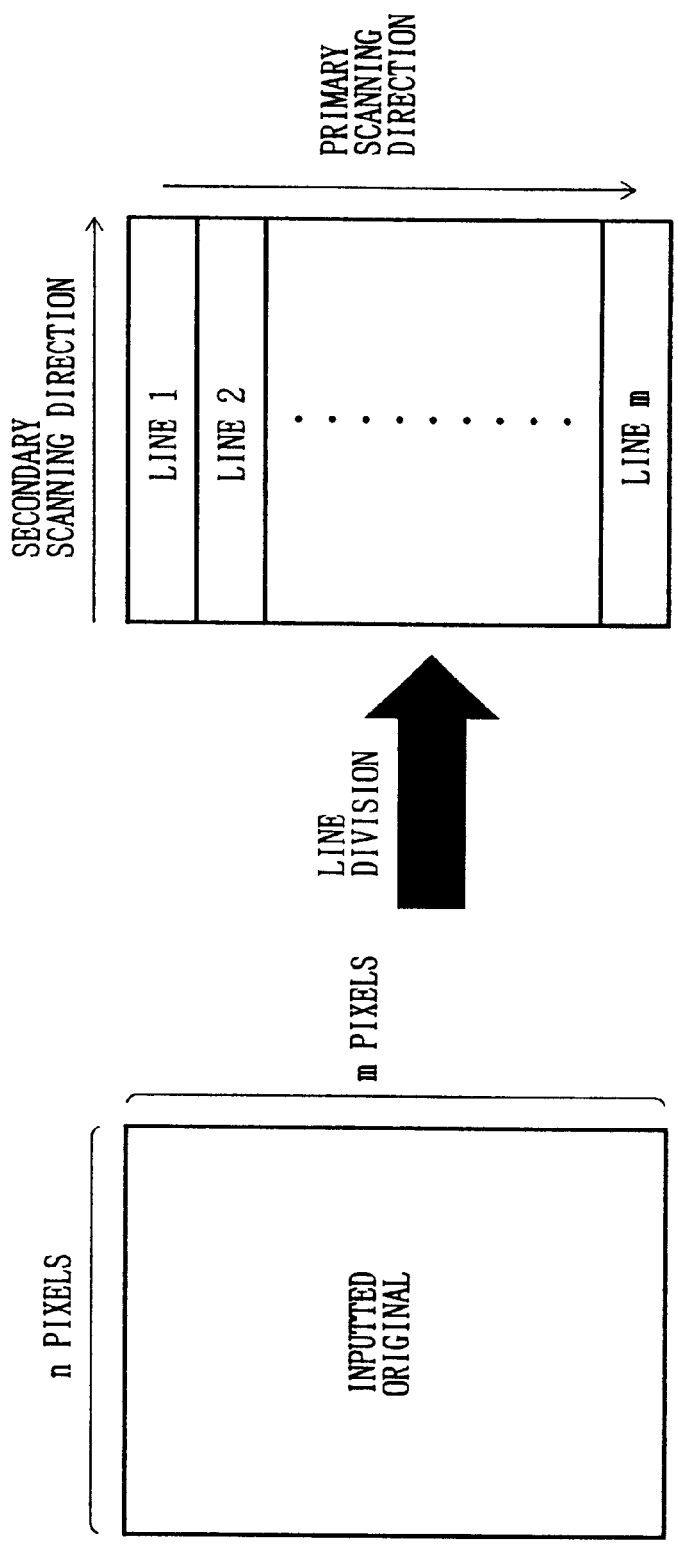
FIG. 2 is an explanatory drawing showing image data of an original for which color type determination is to be performed by the color type determining device shown in FIG. 1.

Here, it will be assumed that image data obtained from the original read by the scanner section 2 is, as shown in FIG. 2, image data made up of m pixels vertically by n pixels horizontally, where m and n are discretionary integers. The phrase "one line," as used in the explanation below, means the pixels in a domain read from the image by the scanner 2 in performing a single reading operation in the secondary scanning direction, and is made up of n pixels. By repeating the reading operation m times in the primary scanning direction, the foregoing image data is obtained.

Figure 3:
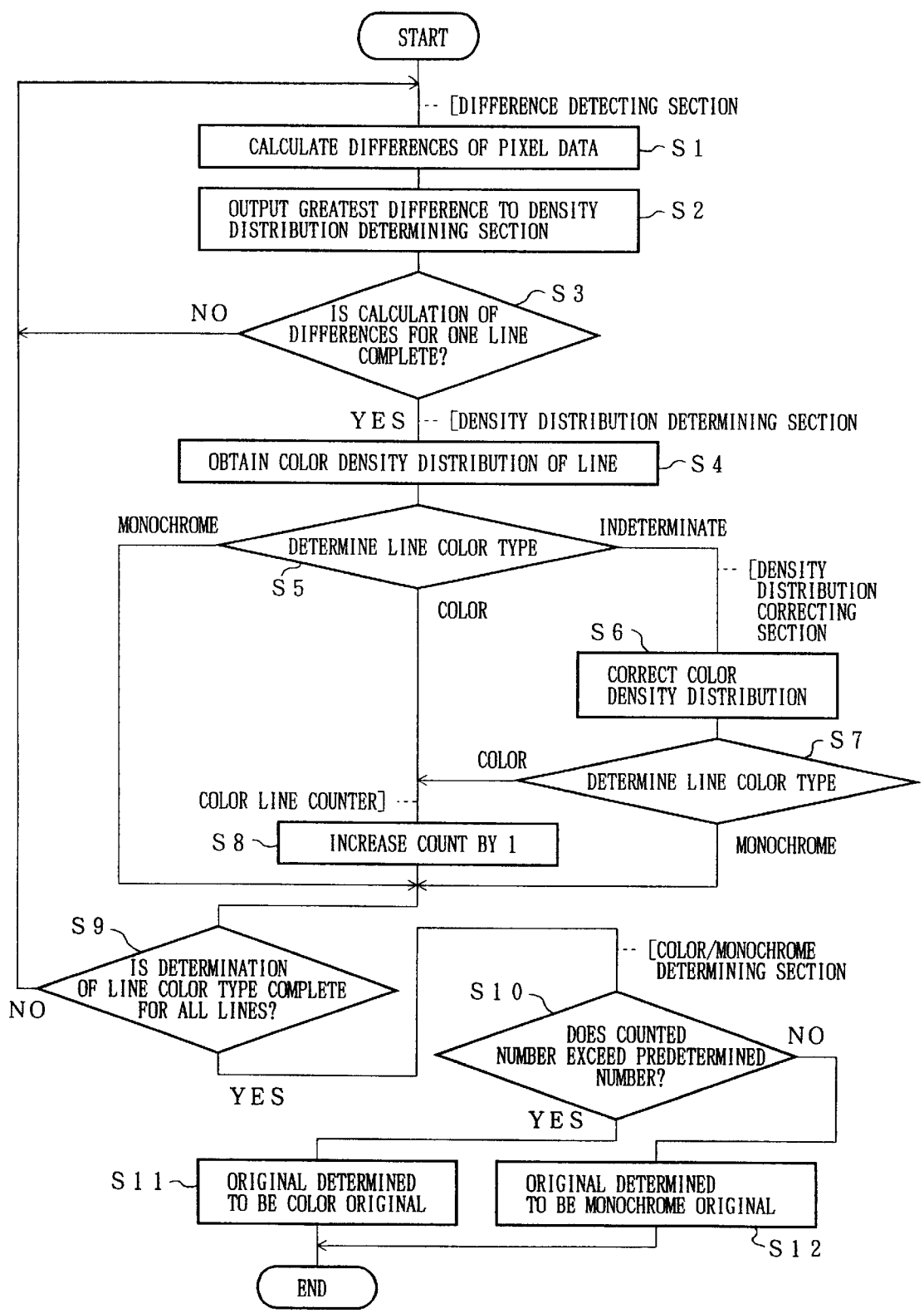
FIG. 3 is a flow-chart showing in outline the operations of the color type determining device shown in FIG. 1.

Next, processing operations of the color type determining device 1 having the foregoing structure will be explained in outline, with reference to the flow-chart in FIG. 3.

The scanner section 2 provides the read data to the difference detecting section 4 in pixels. The difference detecting section 4 calculates from the read data the absolute value of the difference between each pair of color components (hereinafter referred to as the "differences") (S1), and sends the greatest of these differences to the density distribution determining section 5 (S2). The operations of S1 and S2 are repeated until processing of the data for all the pixels of one line is completed (YES in S3)

The density distribution determining section 5 counts the frequency of occurrence of each difference, thus obtaining a color density distribution for each line (S4). Then the density distribution determining section 5 determines from the color density distribution of each line whether that line is a color line or a monochrome line (S5). However, depending on the color density distribution data, there are cases in which the density distribution determining section 5 cannot determine the color type of the line (INDETERMINATE in S5). In such cases, the density distribution correcting section 6 corrects the data (S6), and re-determines whether the line is a color line or a monochrome line (S7).

If the line is determined to be a color line by the density distribution determining section 5 or the density distribution correcting section 6 (COLOR in S5 or S7), the count of the color line counter 7 is increased by 1 (S8). After this kind of line color type determination is completed for all lines (YES in S9), the color type of the original is determined from the number of color lines counted by the color line counter 7. In other words, if the number counted by the color line counter 7 exceeds a certain predetermined number (YES in S10), a signal is sent to the color/monochrome determining section 8, and the original is determined to be a color original (S11). If the counted number does not exceed the predetermined number (NO is S10), the original is determined to be a monochrome original (S12).

Next, processing operations in each section will be explained in further detail.

Figure 4:
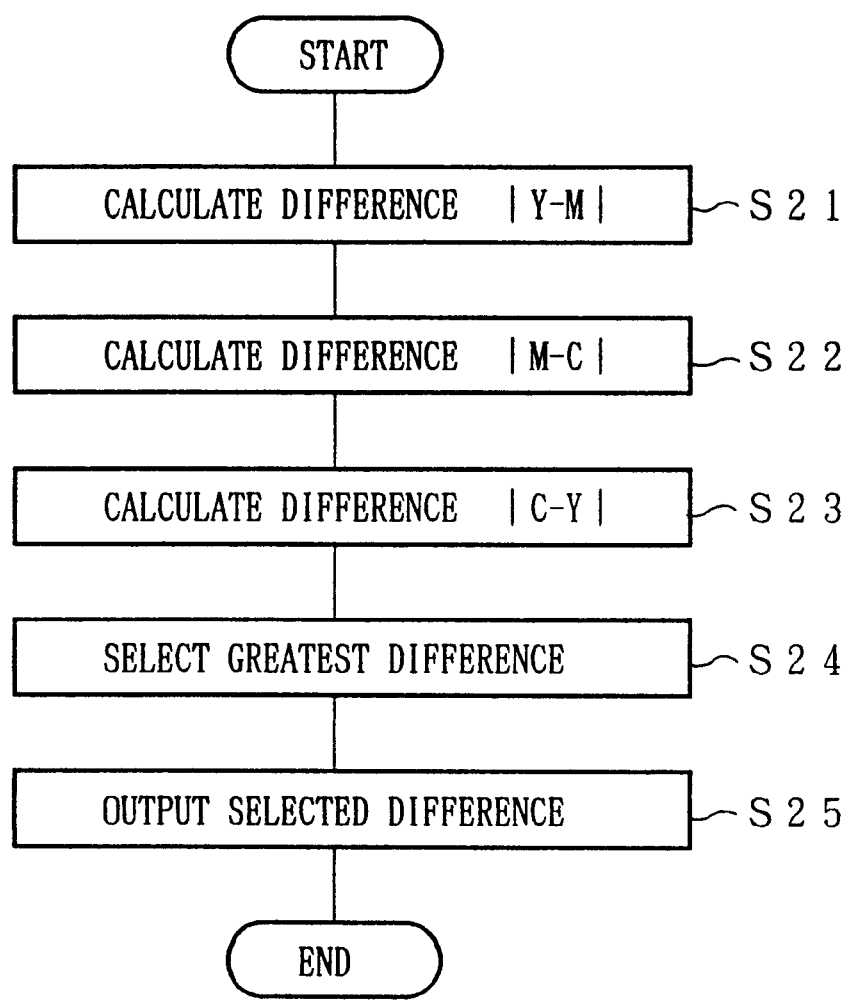
FIG. 4 is a flow-chart showing color density detecting operations of the difference detecting section of the color type determining device shown in FIG. 1.

First, difference detecting operations by the difference detecting section 4 will be explained with reference to the flow-chart in FIG. 4 and the graph in FIG. 5.

The difference detecting section 4 does not calculate the color density distribution of the pixel data itself, but calculates the absolute value of the difference between each pair of color components (the Y signal, M signal, and C signal) making up the pixel data, i.e., the differences |Y-M|, |M-C|, and |C-Y| (S21 through S23). Then, from the three differences calculated, the difference having the greatest value (hereinafter referred to as the "greatest difference") is selected (S24), and the greatest difference selected is sent, as the color density, to the density distribution determining section 5 (S25).

Figure 5:
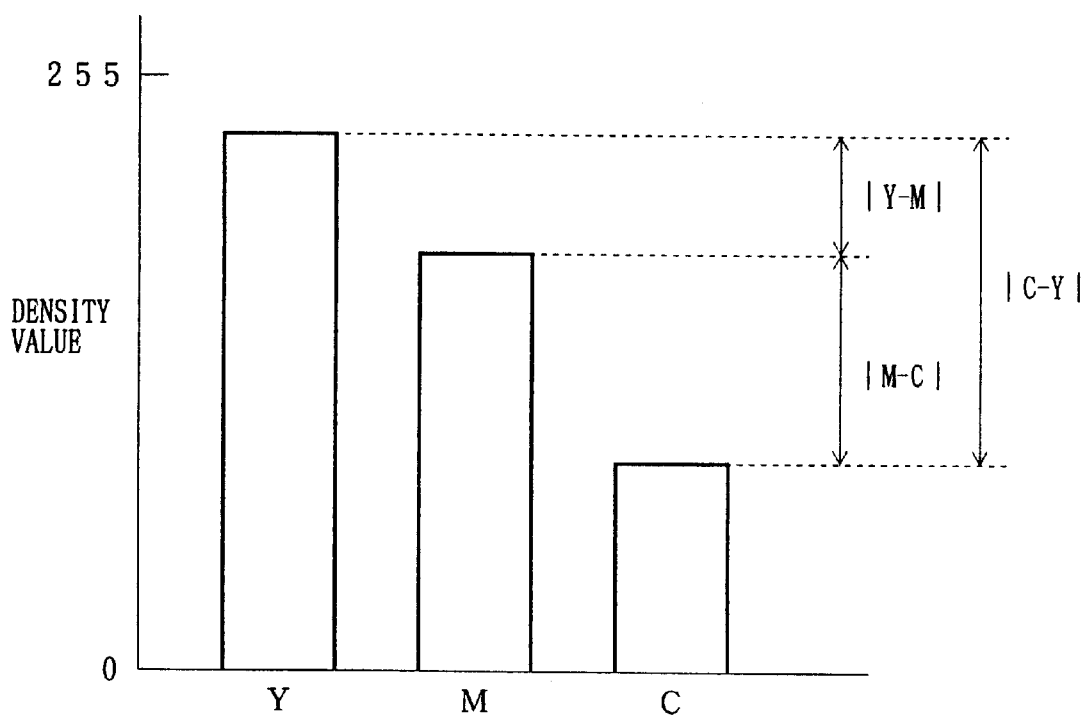
FIG. 5 is an explanatory drawing showing color density detected by the foregoing difference detecting section.

For example, assume that Y, M, and C data like those shown in FIG. 5 are obtained as the read data for a certain pixel. Here, the differences |Y-M|, |M-C|, and |C-Y| between each pair of color components are calculated, and since the difference |C-Y| is greatest, |C-Y| is sent to the density distribution determining section 5 as the greatest difference, i.e., as the color density. The operations in S21 through S25 are performed for all of the pixel data in a line, and the density distribution determining section 5 then calculates the color density distribution of that line.

Next, the method of determining the color type of a line in the density distribution determining section 5 will be explained with reference to the graphs in FIGS. 6(a) and 6(b).

Figure 6A:
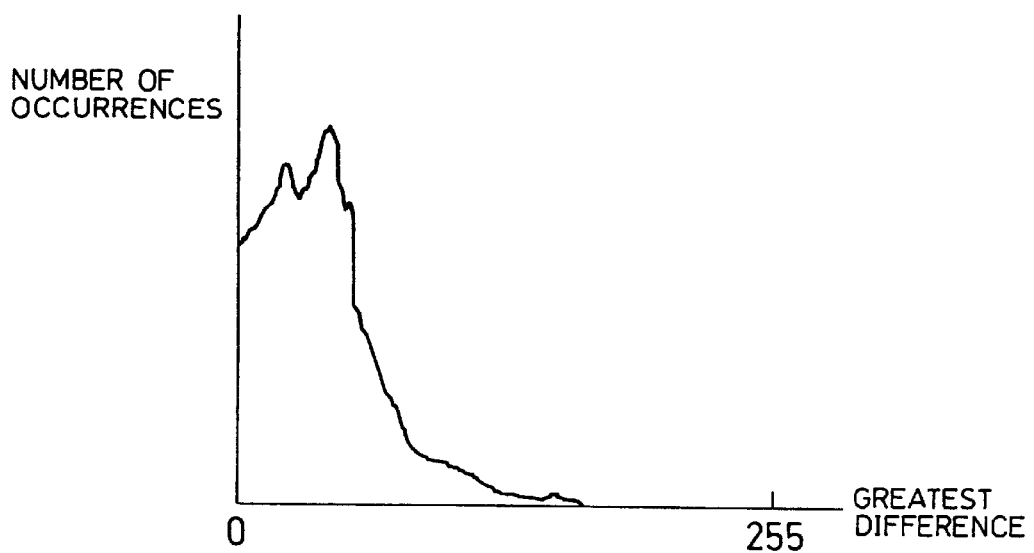
FIGS. 6(a) and 6(b) are graphs showing examples of color density distribution found by the density distribution determining section of the color type determining device shown in FIG. 1.

For example, assume that for a certain line, a color density distribution like that shown in FIG. 6(a) is obtained from the difference detecting section 4. Again, assume that for another line, a color density distribution like that shown in FIG. 6(b) is obtained. In these color density distribution graphs, the horizontal axis is the greatest difference for each pixel, which may show a value of from 0 to 255. The vertical axis is the number of occurrences of each difference within that line.

In FIG. 6(a), the frequency of occurrence of greatest differences is concentrated in the low-density range, and the frequency of occurrence in the high-density range is low. With a color density distribution like that shown in FIG. 6(a), the pixel data is concentrated in a range of small greatest differences. Since, as is clear from FIG. 5, the greatest difference is the difference between the color components having the most disparate density values, a small greatest difference indicates that the density values for each of the color components C, M, and Y are comparatively close. Accordingly, pixels having a small greatest difference may be treated as monochrome pixels. In other words, a line having a color density distribution like that shown in FIG. 6(a) can be determined to be a line which does not include colored information, i.e., a monochrome line.

Figure 6B:
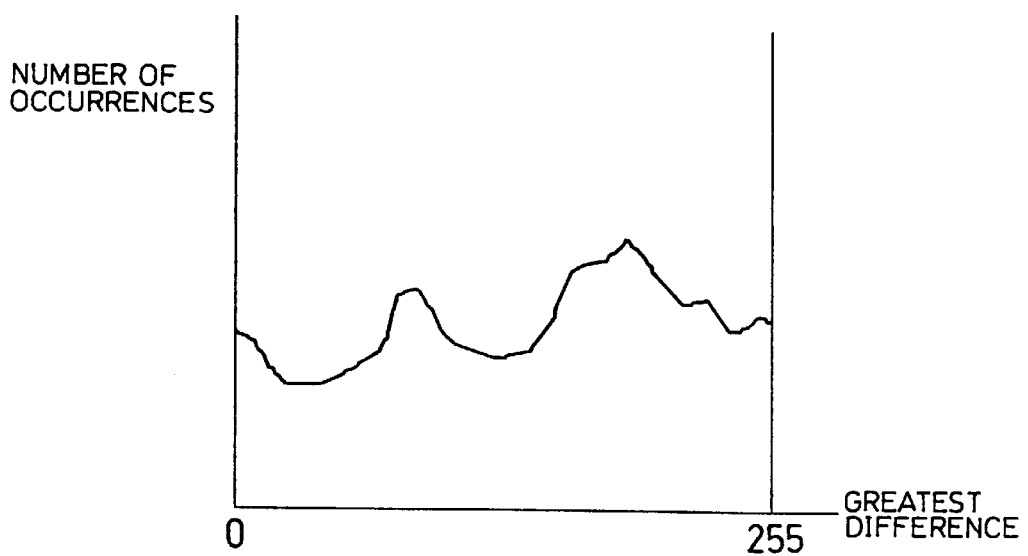

In FIG. 6(b), on the other hand, the frequency of occurrence of greatest differences is scattered over a wide range. A color density distribution like that shown in FIG. 6(b) includes many pixels having a large greatest difference, i.e., color pixels in which the density values of at least two of the color components C, M, and Y are disparate. A line having a color density distribution like that shown in FIG. 6(b) can be determined to be a line which includes colored information, i.e., a color line.

If the line is determined to be a color line, the count of the color line counter 7 is increased by 1, as discussed above. The foregoing determination can be computed by calculation using, for example, the probability density function.

Next, the method of performing color line determination, by dividing a line, in keeping with the greatest difference values, into a colored domain, a non-colored domain, and an indeterminate domain (which cannot be assigned to either of the foregoing), will be explained concretely with reference to the flow-chart in FIG. 7 and the graph in FIG. 8.

Pixels assigned to the indeterminate domain are pixels which, from the color density value alone, cannot easily be determined to be color or monochrome pixels. Examples of such pixels are background portions of the image and portions of intermediate colors such as pastel colors. With regard to background portions, the problem of exclusion of the background is also involved, and it is difficult to determine whether they are color pixels merely from the color density values. Again, with pastel colors, since their values show monochrome characteristics but they appear visually as colors, it is difficult to determine whether they are color pixels merely from the color density values. Conventionally, there was no set way of dealing with background portions of the image and intermediate colors, and in color type determination, they were either ignored or forcibly assigned to colored or non-colored domains.

Figure 7:
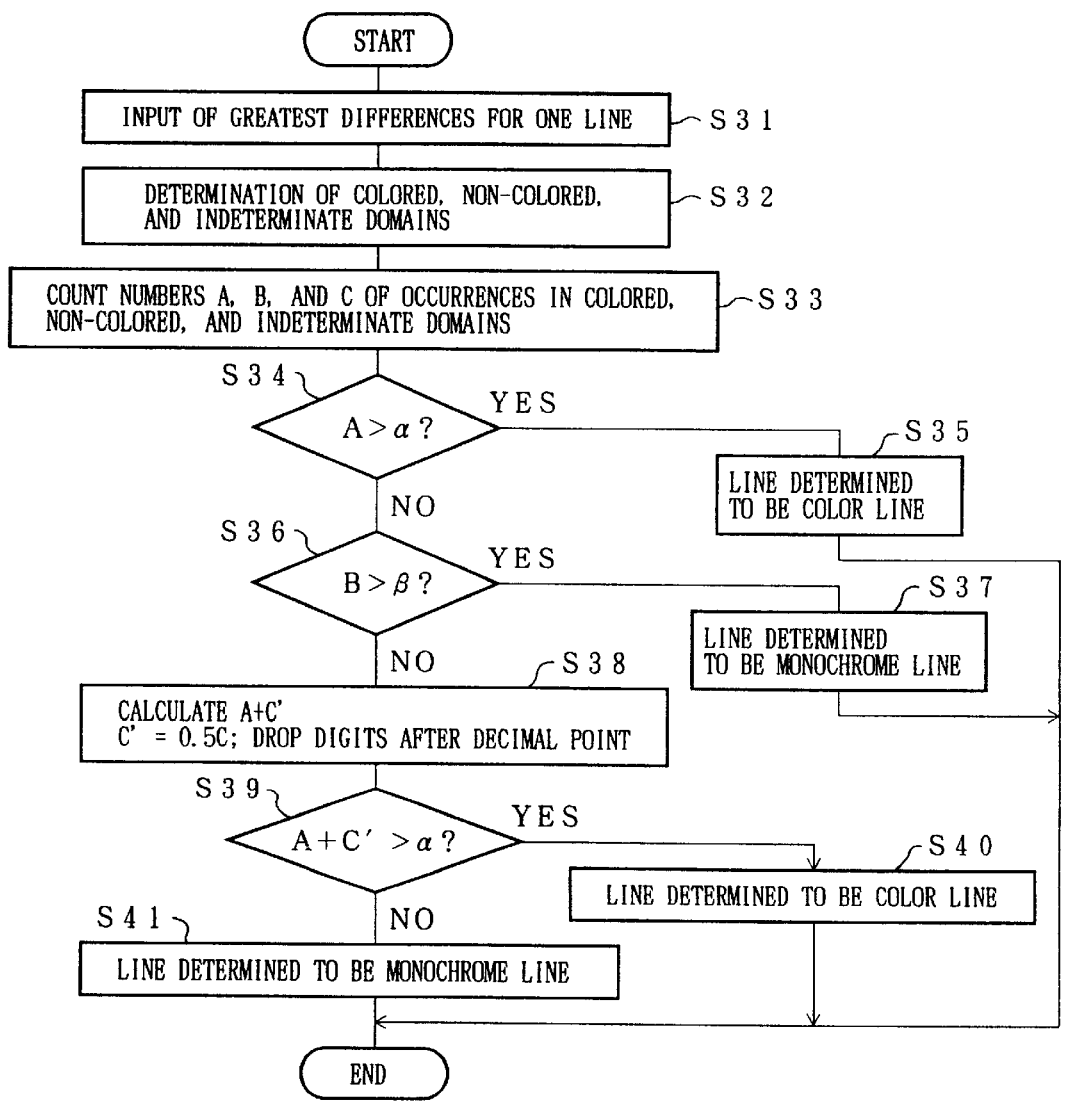
FIG. 7 is a flow-chart showing color line determining operations of the foregoing density distribution determining section.
Figure 8:
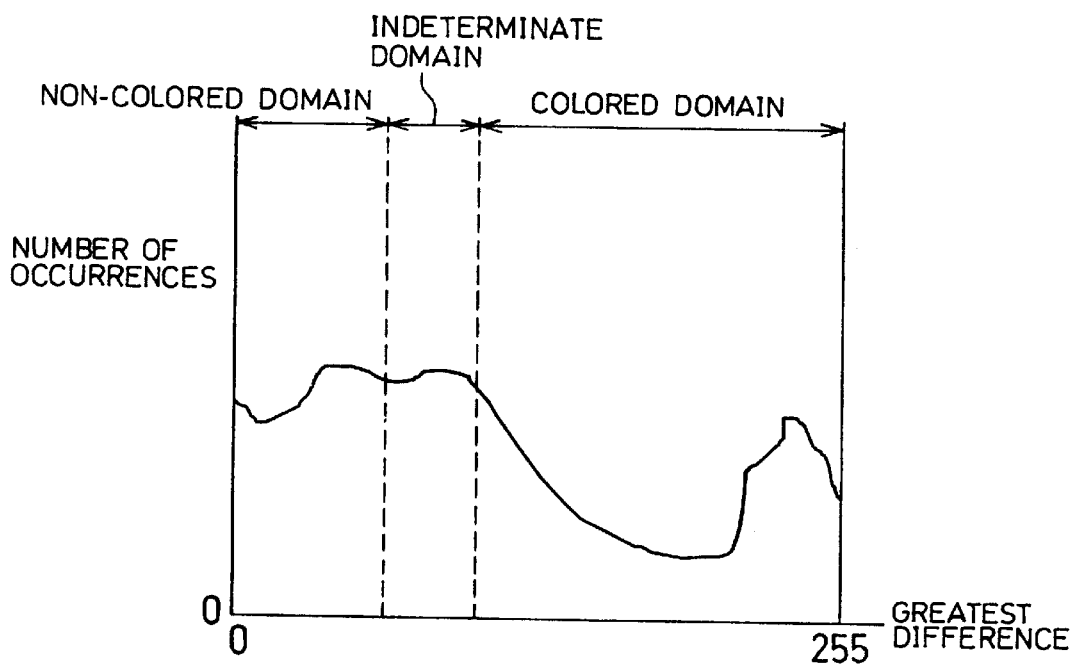
FIG. 8 is a graph showing an example of division of a color density distribution found by the foregoing density distribution determining section into a colored domain, a non-colored domain, and an indeterminate domain.

As shown in FIG. 7, first all of the greatest differences for a line are inputted (S31), and are plotted in the same manner as shown in the graphs in FIGS. 6(a) and 6(b), thus obtaining a color density distribution for that line. Next, as shown in FIG. 8, a domain in which the greatest differences are below a certain value is determined to be the non-colored domain, a domain in which the greatest differences are above another certain value is determined to be the colored domain, and the domain lying between the colored and non-colored domains is determined to be the indeterminate domain (S32). Then, using the greatest differences calculated by the difference detecting section 4, all of the pixels of the line in question are assigned to the colored domain, the non-colored domain, or the indeterminate domain. The difference detecting section 4 then counts a total number A of occurrences of greatest differences in the colored domain (the number of pixels included in the colored domain), a total number B of occurrences of greatest differences in the non-colored domain (the number of pixels included in the non-colored domain), and a total number C of occurrences of greatest differences in the indeterminate domain (the number of pixels included in the indeterminate domain) (S33).

The density distribution determining section 5 determines the color type of the line from the numbers A, B, and C of occurrences in each domain. In other words, first, the number A of occurrences in the colored domain is compared with a predetermined threshold value $\alpha$, and if A>$\alpha$ (YES in S34), the line is automatically determined to be a color line including colored information (S35).

If, on the other hand, A$\leq\alpha$ (NO in S34), the number B of occurrences in the non-colored domain is compared with a predetermined threshold value $\beta$. If B>$\beta$ (YES in S36), the line is automatically determined to be a monochrome line including only non-colored information (S37).

If the line in question fulfills the conditions of neither of the steps S34 and S36, the density distribution correcting section 6 corrects the color density distribution in accordance with the number C of occurrences in the indeterminate domain, and re-determines whether the line is a color line or a monochrome line. In other words, in such a case, the density distribution correcting section 6 calculates a total of the number A of occurrences in the colored domain added to a value C' which is half of the number C of occurrences in the indeterminate domain (in C', any digits after the decimal point are dropped) (S38). Then, the calculated total A+C' is compared to the predetermined threshold value $\alpha$, and if A+C'>$\alpha$ (YES in S39), the line is determined to be a color line including colored information (S40). If A+C'$\leq\alpha$ (NO in S39), then the line is determined to be a monochrome line including only non-colored information (S41).

Figure 9A:
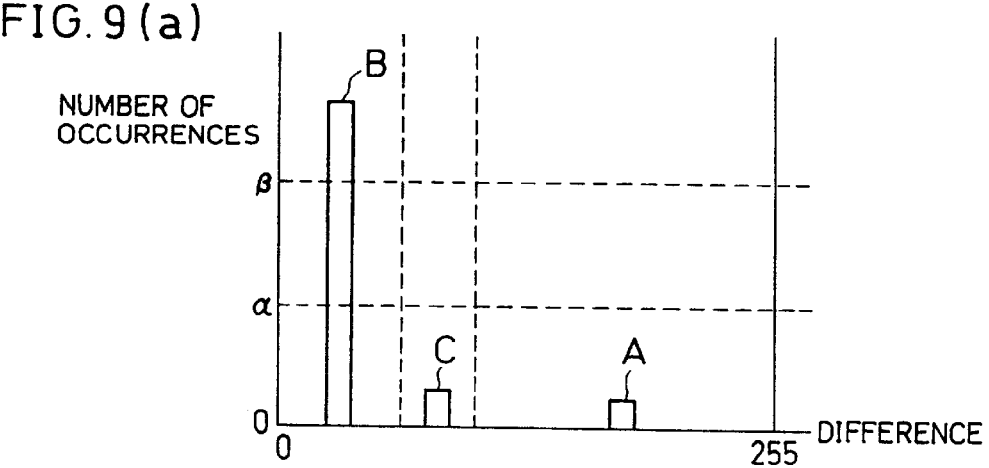
FIGS. 9(a) through 9(c) are graphs showing examples of calculation, from color density distributions found by the foregoing density distribution determining section, of frequencies of occurrence in colored, non-colored, colored, and indeterminate domains.
Figure 9B:
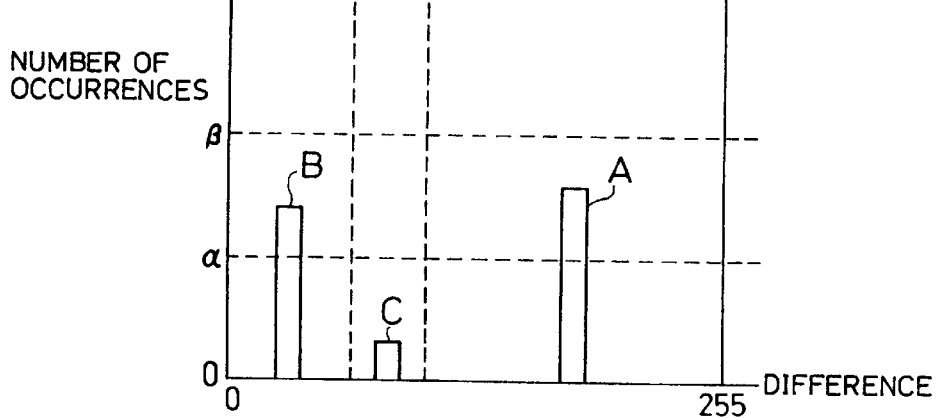

A concrete example of the foregoing color type determination will be explained with reference to the graphs in FIGS. 9(a) through 9(c). As mentioned above, $\alpha$ is a predetermined threshold value for colored determination, and $\beta$ is a predetermined threshold value for non-colored determination. In FIG. 9(a), since the number A of occurrences in the colored domain is less than $\alpha$, and the number B of occurrences in the non-colored domain is more than $\beta$, the line in question is automatically determined to be a monochrome line, and color type determination proceeds to the next line. Again, in FIG. 9(b), since the number A of occurrences in the colored domain exceeds $\alpha$, the line in question is automatically determined to be a color line.

Figure 9C:
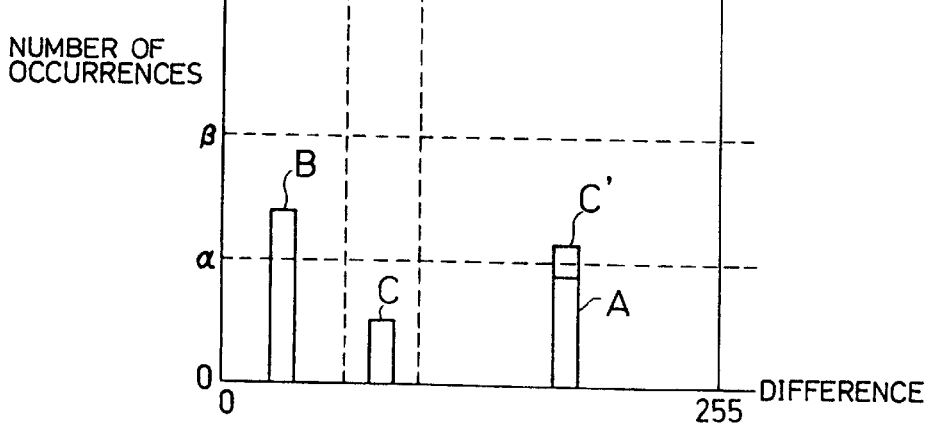

In FIG. 9(c), since the number A of occurrences in the colored domain is less than $\alpha$ and the number B of occurrences in the non-colored domain is less than $\beta$, a determination cannot be made based only on the number of occurrences in the colored and the non-colored domains. Consequently, the determination result is corrected using the number C of occurrences in the indeterminate domain. In other words, since the total of the value C' plus A exceeds $\alpha$, the line in question is finally determined to be a color line.

FIG. 9(c) shows a case in which the total of C' plus A exceeds $\alpha$, but if this total is less than $\alpha$, the line in question is finally determined to be a monochrome line. The color type determination result arrived at in the determination operations in S31 through S41 is the final color type determination of the density distribution determining section 5 or the density distribution correcting section 6 for the line in question.

In this way, in the color type determining device 1 according to the present embodiment, intermediate color portions, etc. falling between the colored domain and the non-colored domain are assigned to a separate indeterminate domain, and whether a line is a color line is first determined using the number of occurrences in each of the colored and non-colored domains. If the color type of the line can be determined solely from the number of occurrences in each of the colored and non-colored domains, the result of this determination is the final color type determination result.

However, if the color type of the line cannot be determined from the number of occurrences in each of the colored and non-colored domains, the color type determining device 1, giving consideration to the number of occurrences in the indeterminate domain, corrects the color density distribution, and re-determines whether the line is a color or a monochrome line. Accordingly, the color type determining device 1 is capable of a color type determination which takes account of background portions, pastel color portions, etc.

Figure 10:
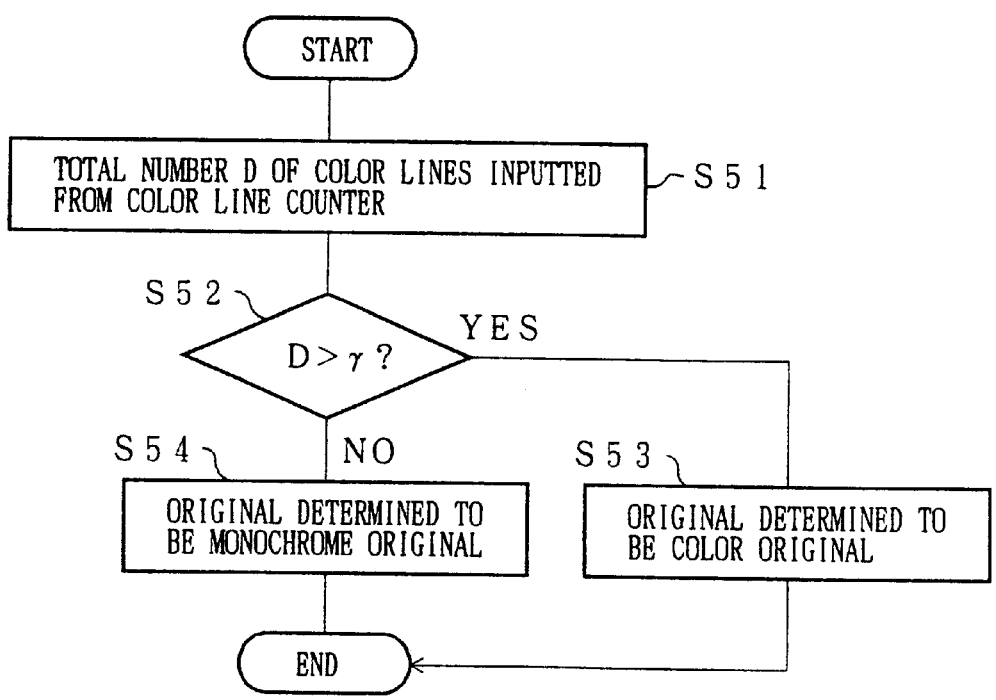
FIG. 10 is a flow-chart showing original color type determining operations of the color/monochrome determining section of the color type determining device shown in FIG. 1.

Next, operations for determining the color type of the original in the color/monochrome determining section 8 will be explained with reference to the flow-chart in FIG. 10.

As explained above, when the density distribution determining section 5 or the density distribution correcting section 6 determines that a line is a color line, the count of the color line counter 7 is increased by 1. Accordingly, when color type determination is completed for all lines of the original, the count of the color line counter 7 is a total number D of color lines.

This total number D of color lines is inputted to the color/monochrome determining section 8 (S51), which compares the total number D with a previously set predetermined threshold value $\gamma$ (S52). Then, if D>$\gamma$ (YES in S52), the original is determined to be a color original (S53). If, on the other hand, D$\leq\gamma$ (NO in S52), the original is determined to be a monochrome original (S54).

Based on the result of the foregoing color type determination, the print mode of the printer section 3 is set to a desired mode, and the original is copied. In other words, when the original is a monochrome original, copying is performed using black toner alone, and when the original is a color original, copying is performed using the three toner colors Y, M, and C, or the four toner colors Y, M, C, and black.

Consequently, monochrome originals made up only of non-colored domains are not copied using three or four colors of toner, and thus excessive consumption of toner is eliminated. Further, since monochrome originals are not copied using a composite of color toners, blurring of the outline of the image due to slight misalignment of the colors is eliminated, and character data, fine lines, etc. can be copied clearly.

As discussed above, in the color type determining device 1 according to the present embodiment, the density distribution determining section 5 finds a color density distribution for each line, calculates from that color density distribution the number of occurrences in each of a colored domain, a non-colored domain, and an indeterminate domain, and, by comparing the number of occurrences in the colored and non-colored domains with respective predetermined threshold values, determines whether the line in question is a color line.

By this means, the color type detecting device 1 can grasp the total characteristics of the entirety of each line, and can determine the general color type of originals, whether they are images having color areas of comparatively small extent or images having color areas of large extent. In other words, since conventional color type determining devices, in determining the color type of lines, used as the basic unit a predetermined number of successive color pixels, a problem with these conventional devices was that they could not perform color type determination for images having color areas of comparatively small extent, such as color images made up of dots. However, the color type determining device 1 according to the present embodiment does not have this problem.

Further, in the density distribution determining section 5, the threshold values α and β, which are the judgment standards for determining from the number of occurrences in each of the colored, non-colored, and indeterminate domains of a line whether the line is a color line, are not specific fixed numbers, but may be changed in keeping with the situation and environment. Accordingly, by changing the threshold values α and β, the dividing line regarding what kind of originals the color type determining device 1 determines are color originals, and what kind of originals it determines are monochrome originals, can be freely changed.

In situations in which the user wishes to intentionally control the standard for color type determination in keeping with the application thereof, for example with a monochrome original including a portion with colored data, the color type determining device 1 can freely set the above-mentioned dividing line, thus enabling color type determination and, in turn, printing of copies which are in keeping with the application thereof. Specifically, with originals such as a monochrome original bearing one or several red seal impressions, a monochrome original with corrections in red ink, etc., the color type determining device 1 can freely set whether such originals are determined to be color originals or monochrome originals.

In addition, the color type determining device 1 according to the present embodiment does not need to first store in a memory the image data received from the scanner section 2, and can, by directly processing the received image data, determine in real time whether an original is a color original or a monochrome original. In other words, the color type determining device 1 is capable of high-speed determination of the color type of originals in a simple circuit structure which does not use a large-scale memory.

Further, with the color type determining device 1, when the density distribution determining section 5 is unable to determine from the number of occurrences in the colored domain and the non-colored domain of a certain line whether that line is a color line, the density distribution correcting section 6 corrects the color density distribution giving consideration to the number of occurrences in the indeterminate domain, and, based on the results of that correction, re-determines whether the line is a color line. By this means, the color type determining device 1 is capable of performing color type determination which takes account of background portions, intermediate colors such as pastel colors, etc., which conventionally were ignored when determining the color type of an original.

In the present embodiment, in determining whether an original is color or monochrome, color density values for the color components Y, M, and C were used. However, the color components inputted from the scanner section 2, and the color density values used by the color type determining device 1 in determining the color type of an original may, alternatively, be the so-called three primary colors R (red), G (green), and B (blue). The color type determining device 1 may then convert the R, G, and B data into Y, M, and C data, and perform printing based on the result of the determination of the color type of the original.

As discussed above, the color type determining device according to the present invention is made up of color density detecting means, which, from the read data, quantify and detect color density of each pixel; density distribution determining means, which, from the color densities found by the color density detecting means, find a color density distribution for each line, and determine from the color density distribution whether that line is a color line including colored information; color line counting means, which count the total number of lines determined to be color lines by the density distribution determining means; and original color type determining means, which determine that the original is a color original including colored information when the total number of color lines counted by the color line counting means exceeds a certain previously set threshold value.

Consequently, the foregoing color type determining device determines whether each line is a color line based on the color density distribution of that line, thus enabling color type determination which takes account of the general characteristics of that line. Accordingly, the precision of determination of the color type of the original can be improved, and flexible color type determination in keeping with needs and with the application thereof is possible.

In addition, the foregoing color type determining device, in determining the color type of the original, first determines whether each line is a color line, and then determines the color type of the entire original using this line information. Accordingly, the memory for processing for determining the color type of the original need only store one line, and a large-scale memory is not needed. Moreover, the flow of line processing conforms to the scanning direction, thus enabling high-speed processing.

In the color type determining device according to the present invention, furthermore, the color density detecting means find differences among the color data for each of the plurality of color components inputted, and, of the differences calculated, output to the density distribution determining means, as the color density, the difference having the greatest absolute value.

Consequently, in addition to the effects discussed above, the color density detected by the color density detecting means is, among the differences in data quantity among the color data for each of the plurality of color components inputted, the difference having the greatest absolute value. Accordingly, the color density detecting means are capable of expressing color density using a single parameter, which enables a simple circuit structure and high-speed processing.

In the color type determining device according to the present invention, furthermore, the density distribution determining means assign all of the pixels in a line to a colored domain made up of color pixels, a non-colored domain made up of monochrome pixels, and an indeterminate domain made up of pixels belonging to neither the colored nor the non-colored domain; count the number of pixels in each domain; and determine whether the line is a color line based on the number of pixels included in the colored and non-colored domains.

Consequently, in addition to the effects discussed above, determination of whether a line is a color line can first be performed based on the number of pixels included in the colored and non-colored domains, and, in cases when this determination cannot be made, by introducing the indeterminate domains, which include pixels of intermediate colors such as pastel colors (which in the past could not be assigned to either color or monochrome), it is possible to determine whether correction of the determination result is necessary. Accordingly, the precision of color/monochrome determination can be improved.

The color type determining device according to the present invention further includes density distribution correcting means, which, when the density distribution determining means are unable to determine whether a certain line is a color line, correct the determination result of the density distribution determining means using the number of pixels belonging to the indeterminate domain, and, based on the result of this correction, redetermine whether the line in question is a color line.

In addition to the effects discussed above, this enables color type determination which also takes into account pixels of intermediate colors (such as pastel colors, which conventionally could not be determined to be color or monochrome) belonging the indeterminate domain, even when a line includes a large number of pixels of such intermediate colors. Thus the precision of color type determination for color lines can be improved, and flexible color type determination in keeping with needs and with the application thereof is possible.

In the color type determining device according to the present invention, furthermore, in the density distribution determining means, threshold values, which are standards for determining from the number of pixels included in the colored domain, non-colored domain, and indeterminate domain of a line whether the line is a color line, are variable.

Consequently, in addition to the effects discussed above, the threshold values, which are the standards by which the density distribution determining means determine from the number of pixels included in the colored domain, non-colored domain, and indeterminate domain of a line whether the line is a color line, can be varied according to the situation or environment. Accordingly, the dividing line between what kind of originals the color type determining device determines are color originals and what kind of originals it determines are monochrome originals, can be freely set, which enables color type determination, and, in turn, printing of copies, which are in keeping with the application thereof.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. A color type determining device which receives read data made up of a plurality of color components read from an original, and determines, based on the read data, whether the original is a color original including colored information, or a black-and-white original made up solely of non-colored information, comprising:

color density detecting means, which, from the read data, quantify and detect color density of each pixel;

density distribution determining means, which, from the color density found by said color density detecting means, find a color density distribution for each line, and determine from the color density distribution for each line whether the line is a color line including colored information;

color line counting means, which count a total number of lines determined to be color lines by said density distribution determining means; and original color type determining means, which determine that the original is a color original including colored information when the total number of color lines counted by said color line counting means exceeds a certain previously set threshold value.

2. The color type determining device set forth in claim 1, wherein:

said color density detecting means find differences among color data for each of the plurality of color components inputted, and, of the differences calculated, output to said density distribution determining means, as the color density, the difference having the greatest absolute value.

3. The color type determining device set forth in claim 2, wherein:

the color components inputted are yellow, magenta, and cyan.

4. The color type determining device set forth in claim 2, wherein:

the color components inputted are red, green, and blue.

5. The color type determining device set forth in claim 1, wherein:

said density distribution determining means assign all of the pixels included in a line to a colored domain, a non-colored domain, and an indeterminate domain belonging to neither the colored nor the non-colored domain, and make a determination of whether the line is a color line based on numbers of pixels included in each of the colored and non-colored domains.

6. The color type determining device set forth in claim 5, further comprising:

density distribution correcting means, which, when said density distribution determining means do not make the determination of whether a certain line is a color line, make a correction of the determination result of said density distribution determining means using a number of pixels belonging to the indeterminate domain, and, based on a result of the correction, re-determine whether the line in question is a color line.

7. The color type determining device set forth in claim 5, wherein:

in said density distribution determining means, threshold values, which are standards for determining from the numbers of pixels included in each of the colored domain, non-colored domain, and indeterminate domain of a line whether the line is a color line, are variable.

8. An image-forming device comprising reading means, which read an original and calculate read data made up of a plurality of color components; the color type determining device set forth in claim 1; and printing means, which select a print mode based on a result of color type determination by said color type determining device.

9. The color type determining device set forth in claim 5, wherein:

said density distribution determining means determines the line to be a color line when the number of pixels included in the colored domain is larger than a first threshold value, and said density distribution determining means determines the line to be a monochrome line when the number of pixels included in the colored domain is not more than the first threshold value and when the number of pixels included in the non-colored domain is larger than a second threshold value.

10. An image-forming method comprising the steps of:

a step a, in which an original is read and read data made up of a plurality of color components is calculated;

a step b, in which, from the read data, color density of each pixel is quantified and detected;

a step c, in which, from the color density of each pixel, a color density distribution of each line is found, and a determination is made from the color density distribution of each line whether the line is a color line including colored information;

a step d, in which a total number of color lines is counted;

a step e, in which, if the total number of color lines exceeds a previously set predetermined threshold value, a determination is made that the original is a color original including colored information; and a step f, in which a print mode is selected based on a result of the determination in said step e, and printing is performed.

11. The image-forming method set forth in claim 10, further comprising the step of:

a step g, between said step c and said step d, in which, when the determination in said step c of whether a line is a color line is not made, the result of the determination is corrected, and it is re-determined whether the line is a color line.

12. The color type determining device set forth in claim 9, comprising, which when the number of pixels included in the colored domain and the number of pixels included in the non-colored domain are determined to be not more than the first threshold value and not more than the second threshold value, respectively, by said density distribution determining means, further comprises:

a density distribution correcting means for making a correction value by adding about one-half of the number of pixels included in the intermediate domain to the number of pixels included in the colored domain, said density distribution determining means determining the line to be a color line when the correction value obtained by the density distribution correcting means is larger than the first threshold value and determining the line as a monochrome line when the correction value is not more than the first threshold value.

* * * * *